United States Patent
McGovern et al.

(10) Patent No.: US 6,836,664 B2
(45) Date of Patent: Dec. 28, 2004

(54) SYSTEM AND METHOD OF ACHIEVING DYNAMIC CHANNEL BANDWIDTH

(75) Inventors: Thomas P. McGovern, LaGrange Park, IL (US); Michael J. Crowley, Oak Park, IL (US); James E. Eastwood, Bellingham, WA (US); Bradley M. Hiben, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 476 days.

(21) Appl. No.: 09/822,605

(22) Filed: Mar. 30, 2001

(65) Prior Publication Data

US 2002/0142777 A1 Oct. 3, 2002

(51) Int. Cl.⁷ ............................................ H04B 15/00
(52) U.S. Cl. .................. 455/450; 455/452.1; 455/452.2
(58) Field of Search .............................. 455/450, 452.1, 455/452.2, 453, 63, 63.1, 451

(56) References Cited

U.S. PATENT DOCUMENTS

| | | | | |
|---|---|---|---|---|
| 5,625,877 A | * | 4/1997 | Dunn et al. | 455/454 |
| 5,914,942 A | * | 6/1999 | Hassan | 370/316 |
| 6,122,516 A | * | 9/2000 | Thompson et al. | 455/450 |
| 6,219,554 B1 | * | 4/2001 | Eswara et al. | 455/452.1 |
| 6,381,462 B1 | * | 4/2002 | Charas | 455/452 |
| 6,510,147 B1 | * | 1/2003 | Sun et al. | 370/335 |
| 6,526,281 B1 | * | 2/2003 | Gorsuch et al. | 455/452.1 |
| 6,580,725 B1 | * | 6/2003 | Phillips | 370/461 |
| 6,591,108 B1 | * | 7/2003 | Herrig | 455/452.1 |
| 6,603,750 B1 | * | 8/2003 | Lindskog et al. | 370/329 |
| 6,704,573 B1 | * | 3/2004 | Paek et al. | 455/452.1 |

* cited by examiner

*Primary Examiner*—William Trost
*Assistant Examiner*—Brandon J. Miller
(74) *Attorney, Agent, or Firm*—Terri S. Hughes; Valerie M. Davis

(57) ABSTRACT

Fixed network equipment (100) initializes a channel aggregation strategy and establishes a default channel aggregation. A request for a service requiring additional bandwidth is received from a device. An updated channel aggregation is generated based upon the request and the channel aggregation strategy to create an updated channel aggregation. The updated channel aggregation is signaled to at least one mobile station (116) via an in-band message.

15 Claims, 4 Drawing Sheets

SYSTEM AND METHOD OF ACHIEVING DYNAMIC CHANNEL BANDWIDTH

FIELD OF THE INVENTION

The present invention relates generally to a land-mobile radio communication system, and in particular to a land-mobile radio communication system employing a number of fixed sites, a number of mobile stations and a number of communication channels.

BACKGROUND OF THE INVENTION

Land-mobile radio communication systems provide a vital service for many types of operations, such as police and fire departments. One embodiment of such a system is a digital system, for data or voice, employing a number of fixed sites separated geographically. Mobile stations generally communicate with the nearest fixed site, and in so doing, a large geographical area can be served without unreasonably high transmitter powers or undesirably high antenna towers. Often, different channel frequencies are used at the various sites to avoid interference and increase throughput. If the number of frequencies available is less then the number of sites required to cover the desired area, a frequency reuse plan may be employed. Up to now, the channels at the various sites have the same bandwidth and the bandwidths are fixed.

Due to the recent increase in demand for data communications services, such as Internet services like the World Wide Web, the size of data messages and their frequency of transmissions have increased and take longer to transfer on existing land-mobile radio communication systems. New cellular radio systems, such as TDMA systems, like GSM, or CDMA systems, like UMTS, allow the data rate available to an individual mobile station to be changed on demand. This is done in TDMA systems by allocating a larger number of time division slots per unit time to the particular user requiring greater throughput. In CDMA systems, a greater number of spreading codes are assigned to the user requiring greater throughput. In both of these systems, wideband channels are subdivided in time or code domains into smaller "logical" channels and a control channel is used to inform mobile station of the time slots or spreading codes to be used by the mobile stations. To use these mechanisms, the system operator must have at least one large channel (e.g., 200 kHz for GSM and 5 MHz for UMTS), and to cover a large area, GSM systems require additional channels. But some operators, like public safety operators, have only a few narrowband channels allocated by law in a spectrum segment that does not support GSM or UMTS.

Thus, there exists a need for a land-mobile radio communication system that can provide high data rates when needed, but that does not require more radio bandwidth than the user already has.

BRIEF DESCRIPTION OF THE DRAWINGS

A preferred embodiment of the invention is now described, by way of example only, with reference to the accompanying drawings in which.

DETAIL DESCRIPTION OF THE PREFERRED EMBODIMENT

Figure 1:
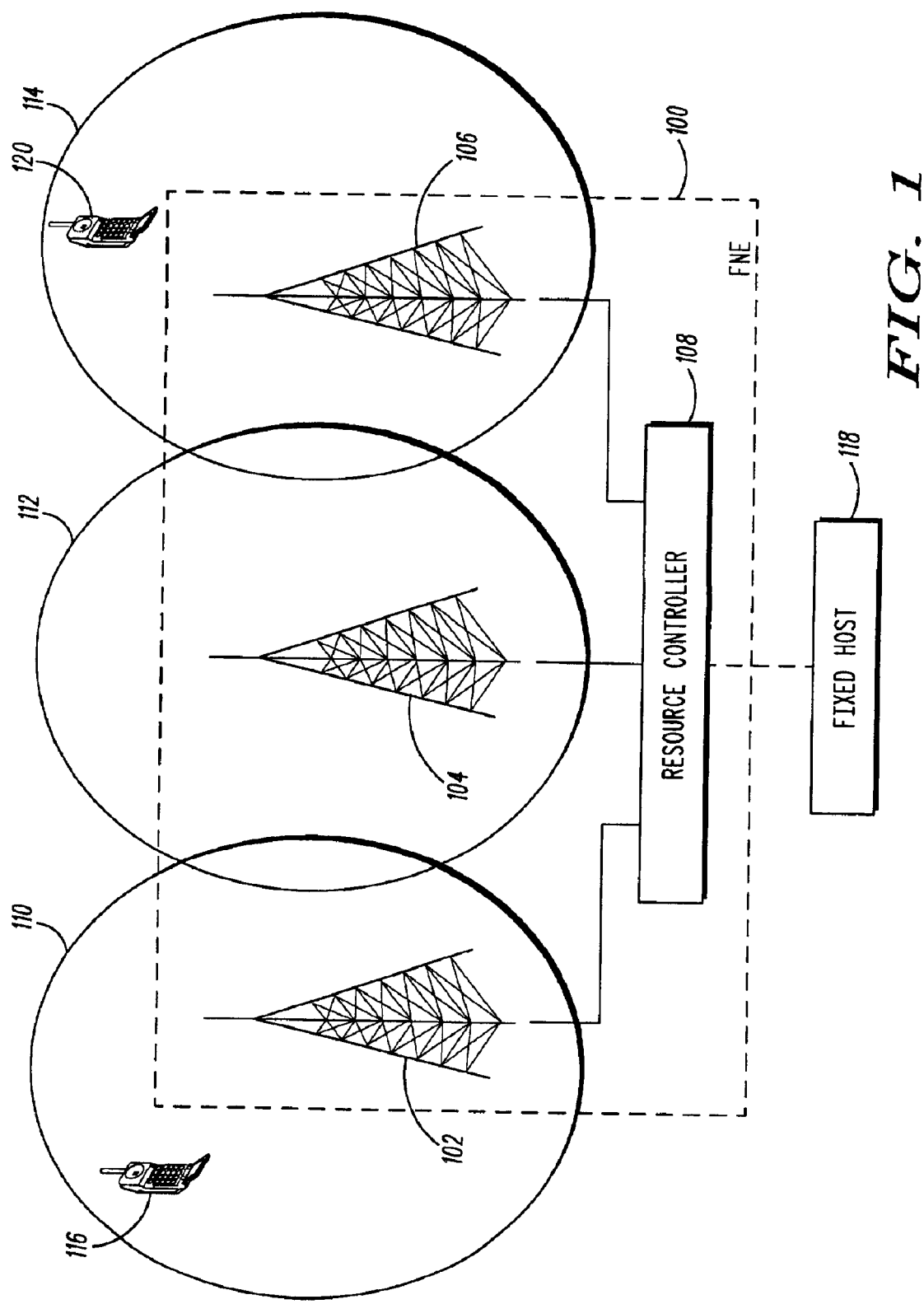
FIG. 1 illustrates a multi-site topology with overlapping coverage in accordance with the preferred embodiment of the present invention.

In accordance with the present invention, a single radio frequency ("RF") fixed network equipment ("FNE") system provides a wideband channel pair and multiple narrowband channel pairs non-simultaneously. The FNE allows an application to invoke a service that is currently transported on a single narrowband channel to remain transported on a single narrowband channel. The FNE also allows the same application to invoke a service that needs to be transported on a single wideband channel, for efficiency purposes, using the same FNE that supports the narrowband channels.

In accordance with the present invention, channel assignment is via inband control instead of a dedicated control channel. This results in a single FNE platform that provides narrowband, wideband, or a combination of the two, providing efficient RF resource usage and maximizing overall traffic throughput.

The wideband channels are provided by aggregating two or more narrowband channels into a single channel of bandwidth equal to the number of channels aggregated. For example, four 12.5 kHz channels, each capable of transmitting 9600 bits per second, may be aggregated into a single 50 kHz channel capable or transmitting 38,400 bits per second. Tuning to the center frequency of the aggregated wideband channel and increasing the bandwidth of the channel radio transmitter and receiver to the required bandwidth accomplish the aggregation. The preferred embodiment of the present invention assumes present day radio technology that requires that the narrowband channels aggregated into a wideband channel be adjacent to each other, in other words, contiguous. Still, the present invention anticipates radio technology that will allow the aggregation of non-adjacent channels into a wideband channel. In this case, the aggregation is not accomplished by tuning to the center frequency of the aggregated channel, but rather by the transmitters transmitting on one or more distinct channels at once and the receivers receiving from one or more distinct channels at once. Also, for clarity, the present invention refers to narrowband and wideband modes of operation, but any number of channels can be aggregated from two channels, to three channels, all the way up to using all the channels available in the radio system. Further, the channels aggregated need not be from the same fixed sites. The number of channels aggregated for a given message depends on the content and size of the message, the usage statistics of the system and an aggregation strategy that is designed to meet the goals of the system operator.

The aggregation strategy, for example, might request only a narrowband channel for a small, non-time critical message, such as a license plate check, when a large number of users are employing the system. On the other hand, a large image, of a lost child perhaps, may be given large bandwidth so that it can be transferred quickly regardless of the number of users employing the system.

Another goal of the aggregation strategy may be to limit the number of aggregation scenarios to a relatively small number in order to reduce the amount of time mobile stations spend scanning for channels when they are turned on. Since the mobile station does not know which site will provide the most robust communication, it must try all the available channels, i.e., scan, to find the best one. Since channels can be aggregated to new bandwidths and channel frequencies, the mobile station may have a large number of channels to scan to find the best channel. By limiting the number of aggregation scenarios, the time the mobile station spends scanning is, on average, reduced.

System components, with respect to the preferred embodiment of the present invention, comprise at least one RF resource controller, multiple fixed sites, and multiple mobile stations. The resource controller maps (allocates) granted service type to the minimum required bandwidth. The resource controller also controls when transmit and receive channels of each fixed site are in wideband mode and narrowband mode. The resource controller further controls transmit and receive frequencies and respective bandwidths of each fixed site. The resource controller generates an in-band RF resource mapping message ("mapping message") to be received by the mobile stations. Frequency synchronization between the mobile stations and the FNE is maintained through the mapping message that is at least transmitted each time the FNE state changes. However, the mapping message could be transmitted on a periodic basis, e.g., as other mobile stations join the system, etc.

As channels are aggregated, the transmitter and/or receiver bandwidth is increased, and the transmit and/or receive frequency is tuned to the middle of the aggregated bandwidth. It should be noted that the inbound (mobile station-to-FNE) channel and the outbound (FNE-to-mobile station) channel need not operate at the same bandwidth at the same time, although doing so may simplify the control logic and reduce the amount of signaling required to notify the mobile stations of the system resource mapping.

Each mobile station maps service type to the minimum allowed bandwidth. The mobile station provides a transmit channel and a receive channel with a width and center frequency specified by the mapping message. The mobile station also determines which narrowband frequency to use for transmissions based on signal quality.

FIG. 1 illustrates an example of a multi-site topology sharing a common wideband channel pair. In the preferred embodiment, the FNE 100 comprises a plurality of fixed sites 102, 104, 106 and a resource controller 108. Circle 110 represents the respective coverage of a given site 102. The same relationship obtains between 104 and 112, and 106 and 114. The sites 102, 104, 106 have overlapping coverage. At least one mobile station 116 is in radio frequency communication with the at least one fixed site 102.

Optionally, a fixed host 118 is coupled to the resource controller 108. The fixed host 118 may originate outbound (FNE 100-to-mobile host 116, 120) messages by supplying the resource controller 108 with message content and the address of the mobile host(s) 116, 120. An example of a fixed host is the National Crime Information Center (NCIC) computer database, which supplies police departments with information about outstanding warrants on criminals. Standard protocol for many police departments is to query the NCIC database using the license plate number of a car stopped for a traffic violation.

Figure 2:
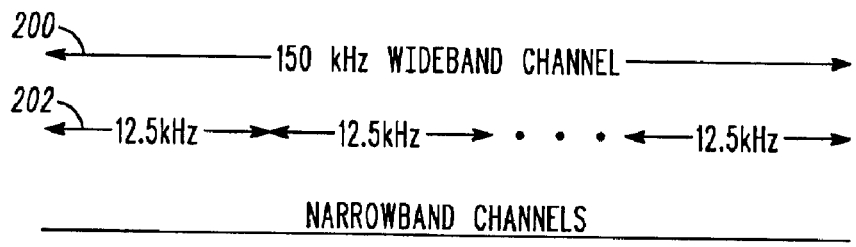
FIG. 2 illustrates a conceptual relationship between a 150 kHz channel and 12.5 kHz channels in accordance with the preferred embodiment of the present invention.

Through in-band control signaling, the FNE 100 controls inbound and outbound channel assignments independently. In the preferred embodiment, wideband channels are 150 kHz wide and narrowband channels are 12.5 kHz wide; however, frequencies may vary according to the application. A conceptual relationship between the 150 kHz channel 200 and the 12.5 kHz channels 202 is illustrated in FIG. 2.

The following description gives examples of how the FNE 100 could control inbound and outbound channel assignments independently in accordance with the present invention. When a 150 kHz outbound channel 200 is required, the resource controller 108 switches at least one fixed site 102 to wideband operation and manages the fixed site's transmissions in a non-interfering manner (e.g., via single frequency reuse or simulcast); the other fixed sites' transmission may be suspended or reduced accordingly, but this is not a requirement. When a 150 kHz inbound channel 200 is required, the resource controller 108 sets all receivers of at least one fixed site 102 to the wideband receive frequency. Again, the other fixed sites' transmission may be suspended or reduced accordingly, but this is not a requirement. When a 150 kHz outbound channel 200 is not required, the transmitters of at least one fixed site is switched to non-interfering narrowband frequencies 202. Dividing the wideband frequency into smaller parts makes the narrowband frequencies. The wideband channel will often be divided into equal parts, but this is not a requirement. All that is required is that the narrowband channels be made from the same spectrum used for the wideband channel. In other words, the narrowband channels are "within the domain" of the wideband channel 200. Tuning to the center frequency of a narrowband channel and reducing the bandwidth accomplish this. Likewise, using the same tuning ability, when a wideband inbound channel 200 is not required, each receive frequency of the fixed sites 102, 104, 106 is narrowband invoking non-interfering frequencies within the domain of the wideband channel 200. These examples of the present invention, and the like, allow the FNE 100 the performance benefit of multiple narrowband channels 202 when a service that requires a wideband channel 200 is not in progress.

Figure 3:
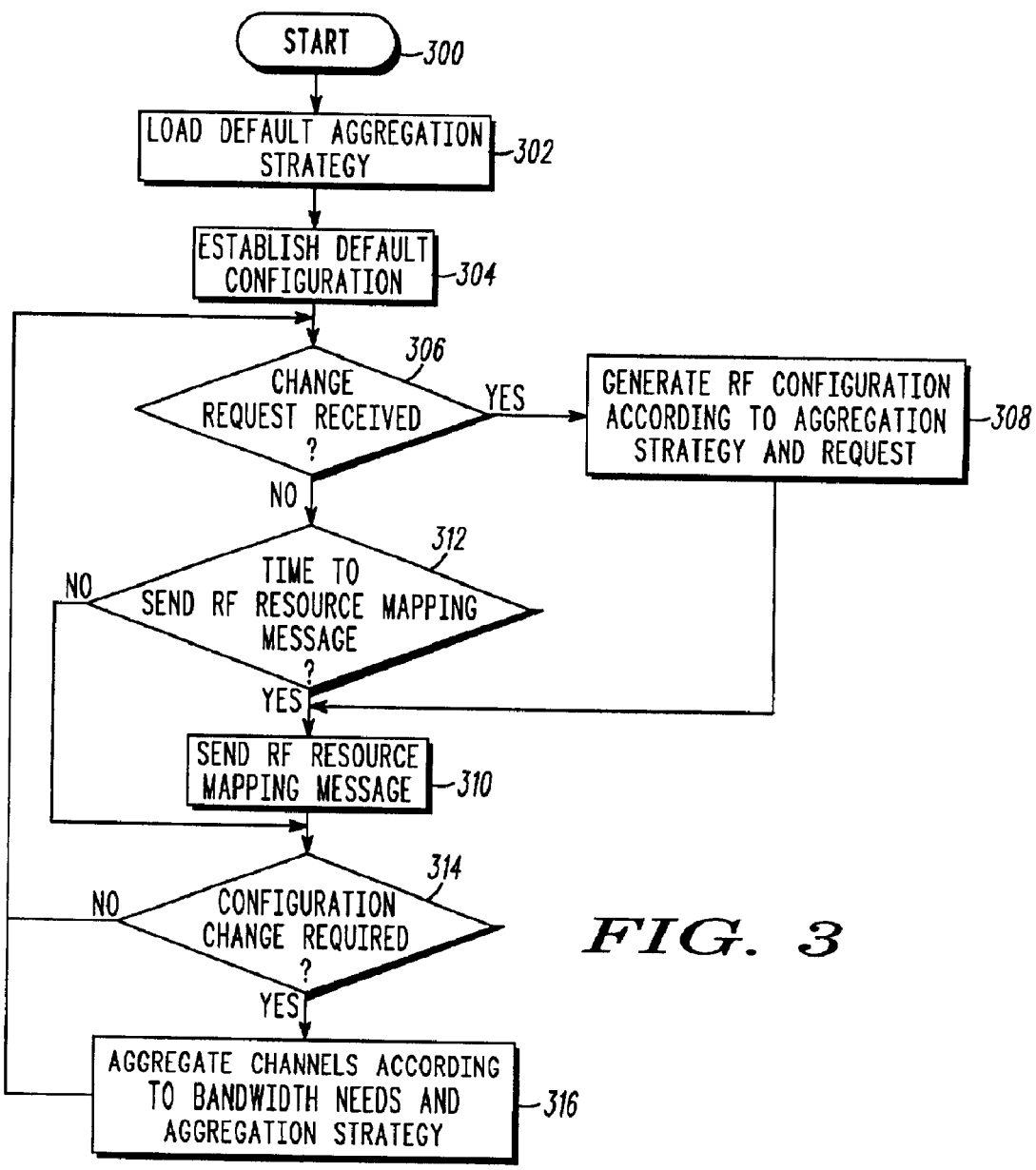
FIG. 3 illustrates a flowchart outlining the operation of the fixed network equipment in accordance with the preferred embodiment of the present invention.

Let us now turn the discussion to the operation of the FNE 100 in accordance with the preferred embodiment of the present invention. At startup 300 for the FNE 100, as illustrate in FIG. 3, the FNE 100 initializes a default channel aggregation strategy 302, and establishes a default channel configuration 304. The aggregation strategy may be algorithmic parameters or rules describing the network being managed. The most common default aggregation strategy is expected to be each fixed site 102, 104, 106 using a unique channel frequency with the total bandwidth split equally between all the fixed sites 102, 104, 106. If there are too many sites such that splitting the total bandwidth equally results in a bandwidth smaller than some minimum bandwidth (e.g., 12.5 kHz), a frequency reuse system could be employed using channels of the minimum bandwidth.

Whenever the FNE 100 receives a request 306, from a fixed host 118 or from a mobile station 116, which would change the channel aggregation, the FNE 100 generates a new RF configuration according to the request and the aggregation strategy 308, and transmits the mapping message 310 to the mobile stations 116, 120 informing them of the new channel aggregation. The mapping message may contain, but is not limited to, the following data: next bandwidths and center frequencies of each fixed site's transmitter and receiver; minimum time duration of each fixed station's next receive state; minimum time duration of each fixed station's next transmit state; and target mobile subscriber address if change is due to mobile station (not fixed host) request.

In the absence of requests that induce aggregation changes, the FNE 100 periodically transmits the mapping message to inform newly joining mobile stations of the present channel configuration 312. Even though mobile stations 116, 120 scan to find channels as they power on, they must receive a mapping message before they can transmit because the inbound and outbound channels may be aggregated differently.

If the aggregation configuration has changed 314 because of step 306, the FNE 100 controls the fixed sites 102, 104, 106 to aggregate the channels according to the new bandwidth needs and the aggregation strategy 316.

Figure 4:
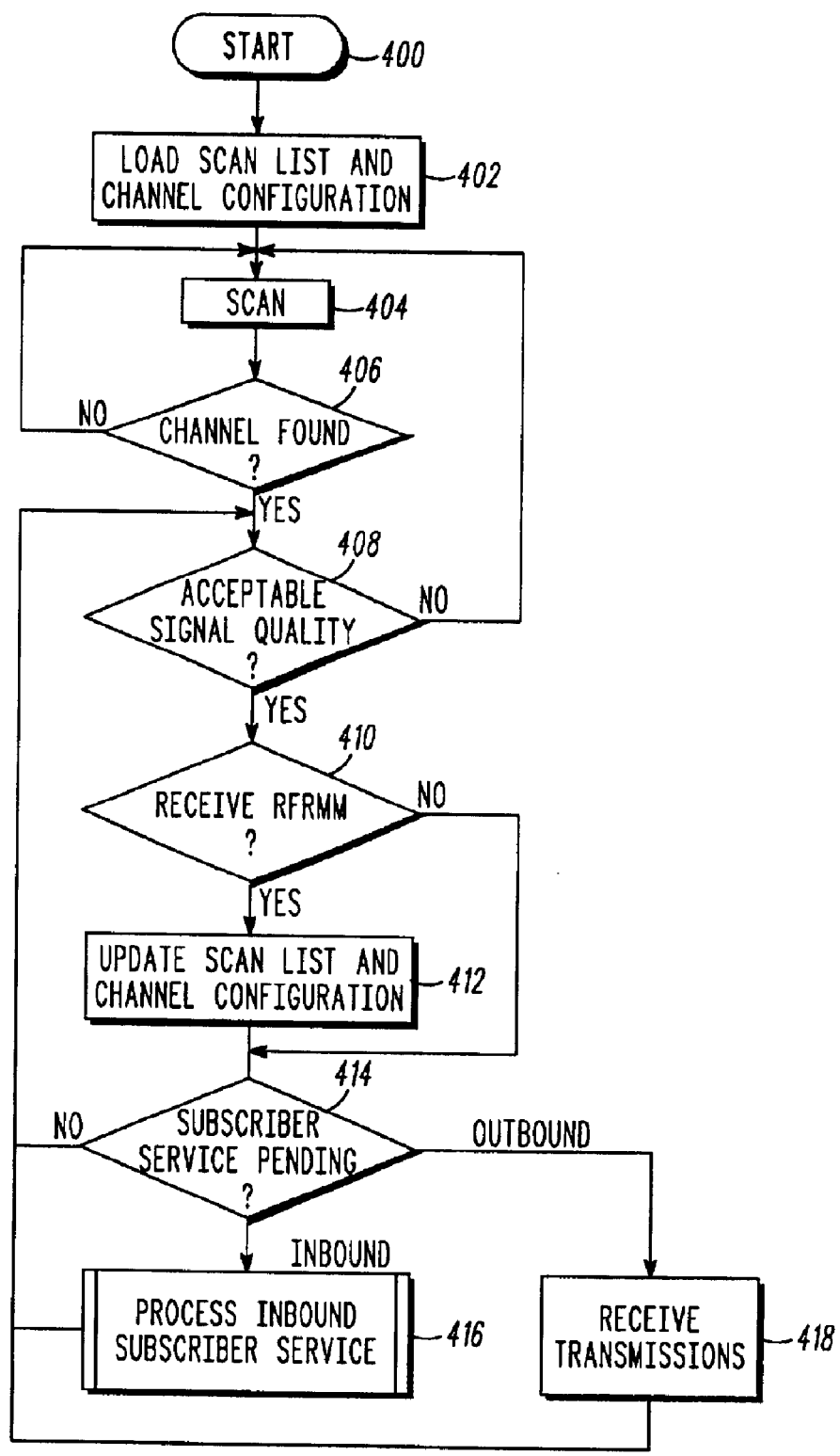
FIG. 4 illustrates a flowchart outlining the operation of the mobile station in accordance with the preferred embodiment of the present invention.

Now let us turn the discussion to FIG. 4 that illustrates the operation of the mobile station 116. At startup 400 of the mobile station 116, the mobile station 116 loads its channel scan list and default configuration 402 into memory. The channel scan list may be discovered in any of a number of well known methods, such as being pre-programmed into the mobile station's memory or from a broadcast control channel, for example. The mobile station 116 then executes the steady-state procedure described in steps 404–418. Directed by its channel scan list, the mobile station 116 scans channels to find one with acceptable signal quality 404. When the mobile station 116 finds an acceptable channel 408, it waits to receive a mapping message 410 or an outbound message 418 from the FNE 100 or sends an inbound message 416 to the FNE 100, as appropriate.

If no inbound or outbound service (i.e., transmit or receive) is pending 414, the mobile station 116 reenters its scan phase, beginning with signal quality determination of the current channel 408. If an inbound or outbound service is pending 414, the mobile station 116 processes the service 416, 418 and returns to the scan phase, beginning with the signal quality determination of the then current channel 408.

Figure 5:
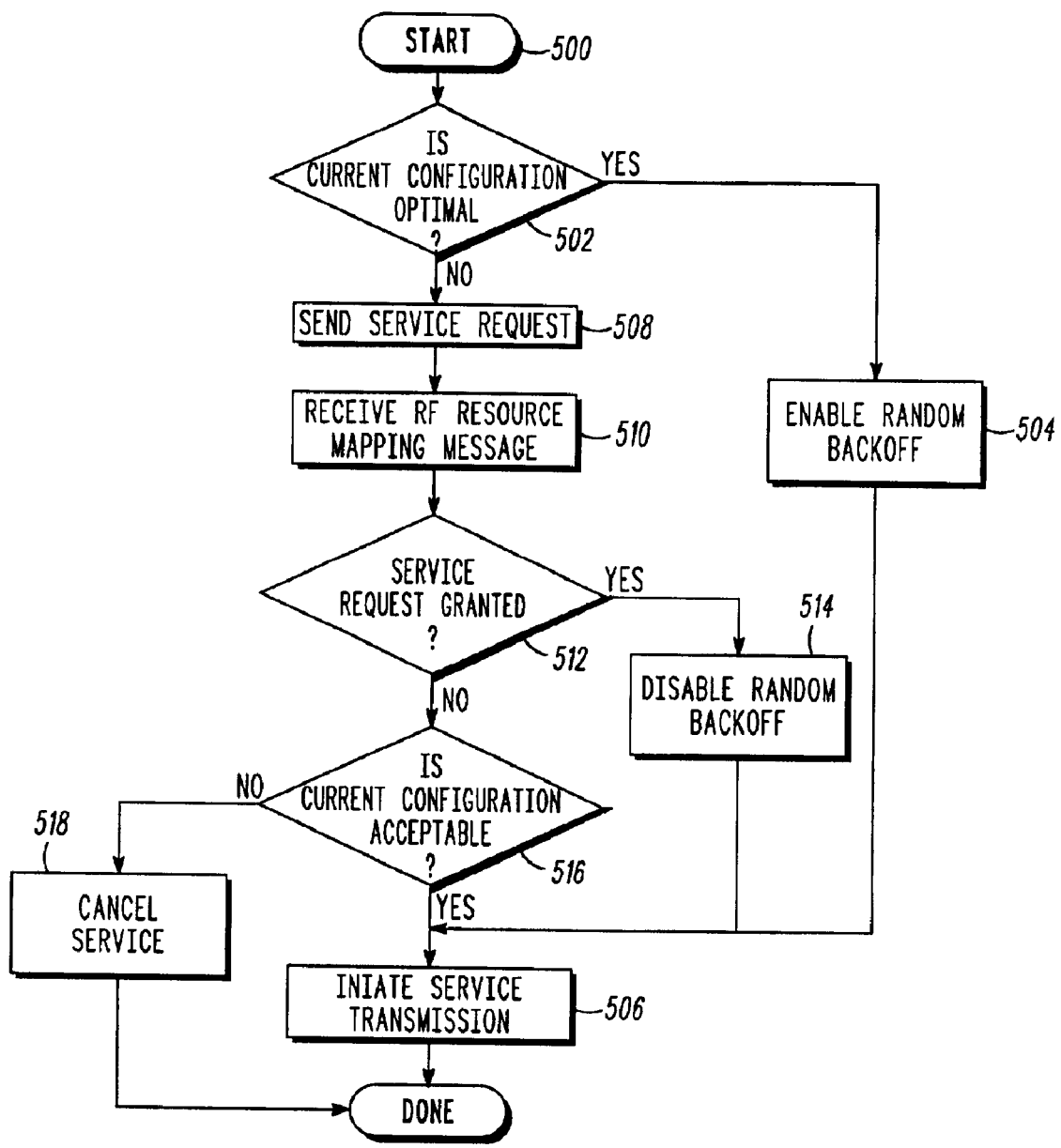
FIG. 5 illustrates a flowchart outlining how the mobile station processes inbound service in accordance with the preferred embodiment of the present invention.

When processing an outbound transmission 416 (FNE 100-to-mobile station 116), the mobile station 116, having configured itself according to steps 400–412 above, receives the outbound data and/or voice transmission. When processing an inbound transmission 500 as illustrated in FIG. 5 (mobile station 116-to-FNE 100), the mobile station 116 first determines if the current channel configuration is "optimal" 502. If yes, the mobile station 116 enables its random back-off facility for RF collision handling 504 as known in the art, and proceeds to initiate the standard transmission sequence for the service 506. If the mobile station 116 determines that the current channel configuration is not optimal for the requested inbound service 502, it sends a service request 508 to the FNE 100, which process the request in step 306, and waits for a mapping message with the address of the mobile station 116 granting or denying the request 510.

If the reconfiguration request is granted 512, the mobile station 116 disables its random back-off facility for RF collision handling 514, thus increasing the probability of early successful transmission. The mobile station 116 then initiates the transmission services 506 and returns to step 416.

If the FNE 100 via a mapping message 512 denies the reconfiguration request, the mobile station 116 determines whether the current configuration is acceptable (though not optimal) 516. If not acceptable, the mobile station 116 cancels the service 518 and returns to step 416. If the current configuration is acceptable 516, the mobile station 116 initiates the transmission service 506 and, when completed, returns to step 416.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method of achieving a dynamic channel bandwidth in a system, the method comprising the steps of:
   initializing a channel aggregation strategy;
   establishing a default channel aggregation for an inbound path using at least one frequency from at least one site;
   establishing a default channel aggregation for an outbound path using at least one frequency from at least one site;
   receiving a request for a service requiring additional bandwidth on either the inbound path or the outbound path from a device;
   generating an updated channel aggregation based upon the request and the channel aggregation strategy to create an updated channel aggregation; and
   signaling the updated channel aggregation to at least one mobile station via an in-band message.

2. The method of claim 1 further comprising the step of aggregating a plurality of channels according to the needed bandwidth and the updated channel aggregation strategy.

3. The method of claim 1 further comprising aggregating a plurality of narrowband channels into at least one wideband channel based on the updated channel aggregation.

4. The method of claim 3 wherein the plurality of narrowband channels are adjacent.

5. The method of claim 3 wherein the plurality of narrowband channels are non-adjacent.

6. The method of claim 1 further comprising dividing at least one wideband channel into a plurality of narrowband channels based on the updated channel aggregation.

7. The method of claim 1 wherein the updated channel aggregation comprises dividing a channel bandwidth into at least one of the following: a plurality of narrowband channels, and a wideband channel.

8. The method of claim 1 wherein the in-band message comprises at least one of: a next bandwidth and center frequency of a transmitter and a receiver of a fixed site; a minimum time duration of a next receive state of a fixed site; and a minimum time duration of a next transmit state of a fixed site.

9. The method of claim 1 further comprising the step of periodically signaling the in-band message to inform newly joining mobile stations of present channel configuration.

10. The method of claim 1 further comprising the steps of:
    invoking a wideband channel when wideband services are needed; and
    invoking non-interfering narrowband channels within a domain of the wideband channel when wideband services are not needed.

11. The method of claim 1 wherein the step of signaling is performed via at least one fixed site.

12. The method of claim 1 further comprising the step of, based on the request, determining an amount of additional bandwidth required for the service.

13. A method of achieving a dynamic channel bandwidth in a system, the method comprising the steps of:
    loading a channel scan list and a default channel configuration;

directed by the channel scan list, scanning a set of channels for a channel with acceptable signal quality;

receiving an in-band message having an updated channel aggregation; and modifying transmit and receive channels based on the in-band message.

14. The method of claim 13 further comprising updating the channel scan list and the default channel configuration based on the in-band message.

15. A system for achieving a dynamic channel bandwidth, the system comprising:

at least one fixed site;

at least one mobile station in radio frequency communication with the at least one fixed site; and at least one resource controller, controlling the at least one fixed site, for performing the steps of:

initializing a channel aggregation strategy;

establishing a default channel aggregation for an inbound path using at least one frequency from at least one site;

establishing a default channel aggregation for an outbound path using at least one frequency from at least one site;

receiving a request for a service requiring additional bandwidth on either the inbound path or the outbound path from a device;

generating an updated channel aggregation based upon the request and the channel aggregation strategy to create an updated channel aggregation; and signaling the updated channel aggregation to at least one mobile station via an in-band message.

* * * * *